US007069352B2

(12) United States Patent
Pezzini

(10) Patent No.: US 7,069,352 B2
(45) Date of Patent: Jun. 27, 2006

(54) SERIAL PERIPHERAL INTERFACE AND RELATED METHODS

(75) Inventor: Saverio Pezzini, Vimercate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 304 days.

(21) Appl. No.: 10/634,150

(22) Filed: Aug. 4, 2003

(65) Prior Publication Data

US 2004/0078500 A1 Apr. 22, 2004

(51) Int. Cl.
*G06F 13/00* (2006.01)
(52) U.S. Cl. .................. 710/33; 710/3; 710/4; 710/305
(58) Field of Classification Search .................... 710/3, 710/4, 33, 305
See application file for complete search history.

(56) References Cited

U.S. PATENT DOCUMENTS 4,958,277 A 9/1990 Hill et al. ................... 364/200
6,108,719 A 8/2000 Klein .......................... 710/10
2004/0019726 A1* 1/2004 Kelley et al. ............... 710/305

OTHER PUBLICATIONS

William Ford and William Topp, Data Structures with C++, 1996, Prentice-Hall Inc., pp. 383-386.*

* cited by examiner

*Primary Examiner*—Kim Huynh
*Assistant Examiner*—Niketa I. Patel
(74) *Attorney, Agent, or Firm*—Lisa K. Jorgenson; Allen, Dyer, Doppelt, Milbrath & Gilchrist, P.A.

(57) ABSTRACT

A serial interface for communicating with peripherals may include a circuit for generating pointers to addresses in sections of a memory, and a circuit for serially transferring data from or to at least one peripheral connected to the interface that is coupled to the memory based upon requisite configuration commands. The interface may further include a control register coupled to the memory and to the serial transfer circuit for controlling data to be transmitted or received. The interface does not require that an external controller provide configuration commands each time data is transmitted or received because the memory sections for storing data may be divided in distinct memory spaces. That is, each memory space may store data for a respective peripheral connected to the interface. Moreover, another memory section may be used to store all of the configuration commands of the interface required for communicating with the peripherals.

11 Claims, 1 Drawing Sheet

SERIAL PERIPHERAL INTERFACE AND RELATED METHODS

FIELD OF THE INVENTION

The present invention relates in general to serial interfaces for data communications between a control unit and external peripherals, and, more particularly, to serial peripheral interfaces (SPIs).

BACKGROUND OF THE INVENTION

Serial interfaces are widely used for data communications between a control unit and its peripherals. In particular, SPIs are commonly associated with microprocessors and their peripherals. A block diagram of a typical prior art SPI interface is shown in FIG. 1. A control circuit PIN CONTROL LOGIC has a pin SCK for either receiving or outputting a clock signal, depending on whether the SPI is in a slave or in a master device, respectively. It also includes a pair of input/output pins MISO (master in/slave out) and MOSI (master out/slave in), as well as another pin SS (Slave select) for allowing external configuration of the SPI interface as a slave device, or for selecting an external peripheral.

If the interface is in a master device, the pin MISO serves as an input for signals coming from the slave device, and the pins MOSI and SS serve as output pins providing signals for the slave device. The opposite happens when the SPI interface is in a slave device.

A pair of FIFO memory buffers TRANSMIT BUFFER and RECEIVE BUFFER respectively store data to be transmitted and received data. These buffers are connected to a bus DATA IN for data to be transmitted to the peripherals, an addresses bus ADDR for memory locations where data in transit is to be stored, and a bus DATA OUT for data received from the connected peripherals. Shift registers RECEIVE SHIFT REGISTER and TRANSMIT SHIFT REGISTER serially receive and transfer, respectively to the circuit PIN CONTROL CIRCUIT received data or data to be transmitted.

The buffers are connected to circuit blocks (i.e., counters) POINTER and CURRENT POINTER which generate a pointer to the memory location to be read. More particularly, the counter POINTER increments the current value of the pointer stored in the register CURRENT POINTER. The comparator COMP compares the current value of the pointer with a predetermined maximum value, generated by the block END POINTER, and eventually indicates that all bits of the word have been read when the maximum value is reached.

The control register CTRL exchanges information for configuring the SPI interface with the control circuit PIN CONTROL LOGIC. It may also load a certain default value in the circuit CURRENT POINTER. Another kind of SPI interface is the so-called "queued SPI" (QSPI), disclosed in U.S. Pat. Nos. 4,816,996 and 4,958,277 to S. C. Hill et al., which is schematically illustrated in FIG. 2. It differs from the interface of FIG. 1 in that the data to be transmitted and received is not stored in a pair of FIFO buffers. Rather, this data is stored in a RAM memory together with commands to be executed.

More particularly, the RAM memory is used to store data in transit between interfaces and peripherals, as well as control commands used to specify the length and destination of data together with other parameters associated with each transfer. The control circuit has chip select pins CS[0-n] for selecting a peripheral to communicate with when the interface is in a master device. The pins CS are not used when the interface is in a slave device. The information necessary for determining the desired chip select value on the relative pin is provided to the control circuit by the RAM memory.

The RAM memory is organized in three memory sections RECEIVE RAM, TRANSMIT RAM and COMMAND RAM, which are respectively for received data, data to be transmitted, and commands for configuring the interface in the desired mode. The pointer provided to the block CURRENT POINTER is used for pointing, at the same time, to a certain word in the memory section RECEIVE RAM, a certain word in the memory section TRANSMIT RAM, and a byte in the memory section COMMAND RAM identified by the address specified on the bus ADDR. The configuration commands to be executed are provided to the interface by an external controller each time that data passes through the interface.

This architecture is more advantageous than illustrated in FIG. 1 in that each time data to be transmitted and a configuration command have been written in the RAM memory, the interface may execute the programmed transfers simply by incrementing the pointer generated by the CURRENT POINTER without the intervention of an external controller. Moreover, when the data to be transmitted has been written in the memory, it may be retransmitted again many times to different peripherals without any further write operations in the memory simply by changing the bits of the configuration command that identify the different destinations.

However, QSPI interfaces require an external controller to write a command in the memory section COMMAND of the RAM memory each time data is exchanged, transmitted to, or received from a peripheral. This is disadvantageous because of the resulting burden placed on the external controller, making its architecture more complex.

SUMMARY OF THE INVENTION

An object of the present invention is to provide a serial interface for communicating with peripherals that does not require an external controller to provide commands for each data exchange with the connected peripherals.

This and other objects, features, and advantages in accordance with the invention are provided by an interface which may include a RAM memory coupled to at least one external data bus for transferring data to be transmitted or received from a peripheral. The RAM memory may also be coupled to an external address bus over which addresses are communicated for storing transmitted or received data in the memory. More particularly, the RAM memory may include a memory section for storing data to be transmitted, a memory section for storing received data, and a memory section for storing configuration commands of the interface.

The interface may also include a circuit or means for generating pointers to addresses in the memory sections, and a circuit or means for serially transferring data from or to at least one peripheral connected to the interface. This circuit is coupled to the memory and executes the configuration command pointer in the memory section for storing commands. A relative control register may also be coupled to the memory and to the serial transfer circuit for controlling the transfer of data to be transmitted or received.

The interface of the present invention advantageously does not require that an external controller provide configuration commands for data to be transmitted or received. According to the invention, the memory sections for storing data are divided in distinct memory spaces, and each memory space stores data pertaining to a respective peripheral connected to the interface. The memory section which stores commands includes all of the configuration commands of the interface for communicating with peripherals connected thereto.

The interface may also include an additional circuit for generating addresses to the memory section storing the configuration commands. This circuit receives addresses provided on the external address bus and generates corresponding addresses based thereon at which the appropriate configuration commands to be executed are stored.

A method aspect of the invention is for managing a serial peripheral interface of the invention and may include initializing the interface by loading, in the memory section dedicated to storing commands, the configuration commands of the interface for communicating with the peripherals connected thereto. The method may further include associating with each connected peripheral respective memory spaces of the memory sections for storing data in transit to or from the peripheral. Moreover, for each address on the address bus, corresponding addresses of the memory section including the configuration commands may be generated.

For transmitting data to a certain peripheral, the method may further include sending an address on the address bus of the memory section for storing data associated with the peripheral to be transmitted, and configuring the interface according to the commands stored in the corresponding addresses of the memory section including the configuration commands. Further, for receiving data from a certain peripheral, the method may include sending an address on the address bus of the memory section for storing received data associated with the peripheral. Also, the interface may be configured according to the commands stored at the corresponding addresses of the memory section including the configuration commands.

In practice, data conveyed through the interface is written at different addresses depending on the peripheral with which it is associated. Therefore, it is sufficient to specify the memory address at which the data to be transmitted is stored, or at which received data is to be stored, for identifying the peripheral to which the data belongs. Thus, the appropriate interface configuration commands may be executed, because the configuration memory has already been provided with the configuration commands that may be used for communicating with the connected peripherals. In this way, the external controller no longer need be engaged in any interface configuration task during data exchanges.

BRIEF DESCRIPTION OF THE DRAWINGS

The various aspects and advantages of the invention will become more evident through a detailed description with reference to the attached drawings, in which.

DETAILED DESCRIPTION OF THE PREFERRED EMBODIMENTS

Figure 1:
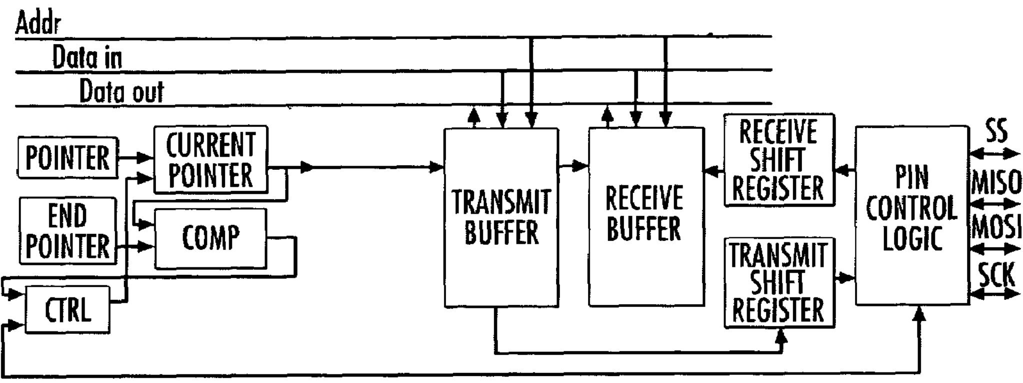
FIG. 1 is a schematic block diagram of the architecture of a prior art SPI interface.
Figure 2:
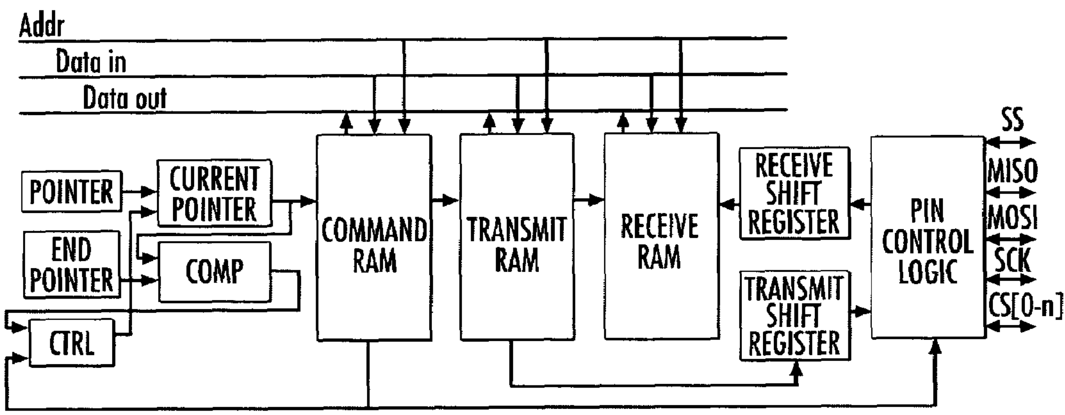
FIG. 2 is a schematic block diagram of the architecture of a prior art queued SPI.
Figure 3:
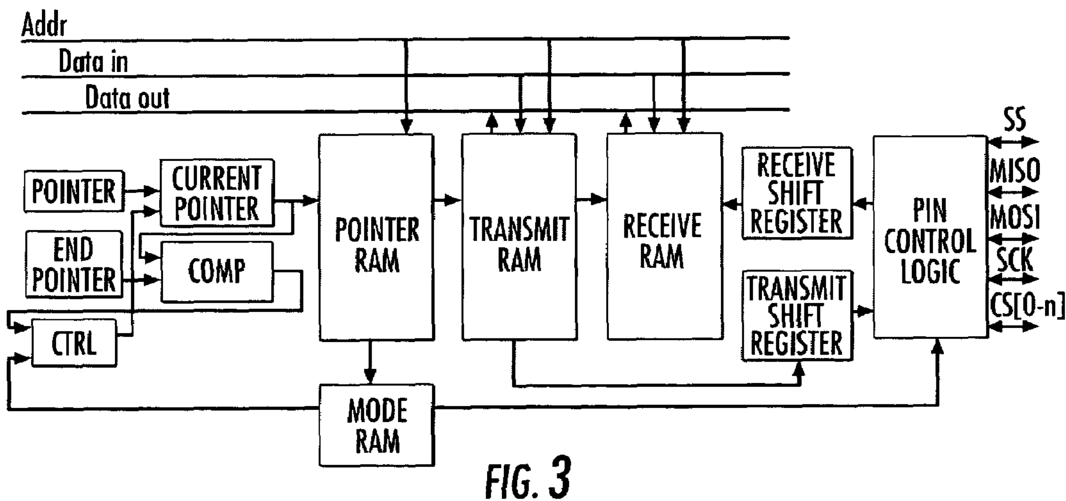
FIG. 3 is a schematic block diagram of an interface in accordance with the present invention having a memory section including configuration commands of the interface for peripherals connected thereto.

The SPI interface of the present invention is illustrated in FIG. 3. As may be observed, its general architecture is similar to that of a Queued SPI. Yet, instead of the block COMMAND RAM, a configuration memory MODE RAM and a pointer generator POINTER RAM which provides pointers thereto. The size of the configuration memory is determined by the number of commands to be executed, and thus by the number of external peripherals that may be coupled through the interface. Each of the peripherals is selected by activating a respective chip select CS[0-n].

The interface of the present invention is managed using an initialization phase in which the memory MODE RAM is programmed with all the required configuration commands for the peripherals associated therewith. This is done because the peripherals connected to the device including the interface are recognized only after initialization of the interface. Thereafter, distinct memory spaces of the memory sections TRANSMIT RAM, RECEIVE RAM are dedicated for storing data to be transmitted and received, respectively, for each connected peripheral. Thus, based upon the address on the bus ADDR, it may be determined whether data to be transmitted or received needs to be stored, and which peripheral it is associated with.

For example, assume the interface is in a master device, and data associated with the peripheral identified by the chip select X is to be transmitted. In the case of a queued SPI of the prior art, an external controller must provide respective configuration commands for any data to be transmitted. Yet, with the SPI interface of the present invention, only the data and a relative address ADDR which corresponds to a certain address X of the memory section TRANSMIT RAM need be provided.

In fact, the address ADDR not only specifies to the interface that the data is to be stored in the memory section TRANSMIT RAM at the address X, but it also informs the interface that the data is to be transmitted to the peripheral X. Moreover, the block POINTER RAM receives the address on the bus ADDR and derives therefrom the addresses of the memory MODE RAM where the appropriate interface configuration commands are stored. These commands are used for transmitting the data to the peripheral identified by the chip select X.

If the interface of the present invention is used in a slave device, then the address on the bus ADDR pertains to the memory section RECEIVE RAM. It will be associated with an address of the memory MODE RAM at which the appropriate configuration command is stored to be executed in the receiving mode.

The interface of the present invention allows transmission and reception operations to be carried out without requiring that an external controller send an appropriate configuration command to the interface with each transfer. In this way, while preserving the possibility of varying the number and type of peripherals connected to the interface according to the user's needs, the structure of the external controller may be significantly simplified.

What is claimed is:

1. A serial peripheral interface comprising:

a memory coupled to at least one data bus and an address bus, said memory for storing data from the at least one data bus associated with a plurality of peripheral devices based upon respective data addresses on the address bus, said memory having a respective transmit data section and a respective receive data section for each peripheral device and also having a configuration command section for storing configuration commands for use in communicating with each of the peripheral devices;

a data pointer for pointing to transmit and receive data section addresses;

a control register for controlling said data pointer based upon at least one configuration command associated with a selected peripheral device;

a data transfer circuit for serially transferring data between said memory and the selected peripheral device based upon the at least one configuration command; and a configuration pointer for pointing to an address at which the at least one configuration command is stored in the configuration command section based upon a data address on the at least one data bus.

2. The serial peripheral interface of claim 1 wherein said memory comprises a random access memory (RAM).

3. The serial peripheral interface of claim 1 wherein said configuration pointer comprises a random access memory (RAM).

4. The serial peripheral interface of claim 1 wherein the at least one data bus comprises a data reception bus for receiving data from the peripheral devices, and a data transmission bus for transferring data to the peripheral devices.

5. A serial communication device comprising:

at least one data bus and an address bus;

a processor coupled to said at least one data bus and said address bus; and a serial peripheral interface coupled to said processor and comprising a memory coupled to said at least one data bus and said address bus, said memory for storing data from the at least one data bus associated with a plurality of peripheral devices based upon respective data addresses on the address bus, said memory having a respective transmit data section and a respective receive data section for each peripheral device and also having a configuration command section for storing configuration commands for use in communicating with each of the peripheral devices, a data pointer for pointing to transmit and receive data section addresses, a control register for controlling said data pointer based upon at least one configuration command associated with a selected peripheral device, a data transfer circuit for serially transferring data between said memory and the selected peripheral device based upon the at least one configuration command, and a configuration pointer for pointing to an address at which the at least one configuration command is stored in the configuration command section based upon a data address on the at least one data bus.

6. The serial communication device of claim 5 wherein said memory comprises a random access memory (RAM).

7. The serial communication device of claim 5 wherein said configuration pointer comprises a random access memory (RAM).

8. The serial communication device of claim 5 wherein the at least one data bus comprises a data reception bus for receiving data from the peripheral devices, and a data transmission bus for transferring data to the peripheral devices.

9. A serial data transfer method comprising:

coupling a memory to at least one data bus and an address bus, the at least one data bus also being coupled to a plurality of peripheral devices, the memory having a respective transmit data section and a respective receive data section for each peripheral device and also having a configuration command section for storing configuration commands for use in communicating with each of the peripheral devices;

storing the configuration commands in the configuration command section;

determining an address at which at least one configuration command for a selected peripheral device is stored in the configuration command section based upon a data address on the at least one data bus; and serially transferring data between the memory and the selected peripheral device based upon the at least one configuration command.

10. The method of claim 9 wherein the memory comprises a random access memory (RAM).

11. The method of claim 9 wherein the at least one data bus comprises a data reception bus for receiving data from the peripheral devices, and a data transmission bus for transferring data to the peripheral devices.

* * * * *

UNITED STATES PATENT AND TRADEMARK OFFICE

CERTIFICATE OF CORRECTION

PATENT NO. : 7,069,352 B2
APPLICATION NO. : 10/634150
DATED : June 27, 2006
INVENTOR(S) : Pezzini It is certified that error appears in the above-identified patent and that said Letters Patent is hereby corrected as shown below:

Title Page, (30) Foreign Application Priority Data
Insert -- August 7, 2002 (EP).........02425517 --

Column 1, Line 38 Delete: “respectively”
Insert: -- respectively, --

Signed and Sealed this

Twenty-seventh Day of March, 2007

JON W. DUDAS
*Director of the United States Patent and Trademark Office*